US012046215B2

(12) United States Patent
Sawahata

(10) Patent No.: US 12,046,215 B2
(45) Date of Patent: Jul. 23, 2024

(54) DISPLAY DEVICE

(71) Applicant: Sharp Display Technology Corporation, Kameyama (JP)

(72) Inventor: Junichi Sawahata, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/228,715

(22) Filed: Aug. 1, 2023

(65) Prior Publication Data

US 2024/0046900 A1 Feb. 8, 2024

(30) Foreign Application Priority Data

Aug. 8, 2022 (JP) ................................ 2022-126400

(51) Int. Cl.
*G09G 3/36* (2006.01)

(52) U.S. Cl.
CPC ......... *G09G 3/3688* (2013.01); *G09G 3/3677* (2013.01); *G09G 2310/0278* (2013.01)

(58) Field of Classification Search
CPC ............ G09G 3/3275; G09G 2330/08; G09G 3/3688; G09G 3/3677; G09G 3/3648; G09G 3/3685; G09G 2310/0291; G09G 2310/0264; G09G 2310/08; G09G 2310/0278; G02F 1/136259; G02F 1/136263; G02F 1/136272
See application file for complete search history.

(56) References Cited

U.S. PATENT DOCUMENTS

2007/0195030 A1* 8/2007 Huang ................ G09G 3/3648 345/87
2008/0018636 A1* 1/2008 Chang ................. G09G 3/3685 345/204
2015/0097871 A1 4/2015 Kumeta et al.
2021/0280144 A1 9/2021 Miyawaki

FOREIGN PATENT DOCUMENTS

JP 2015-082063 A 4/2015
WO 2020012654 A1 1/2020

* cited by examiner

*Primary Examiner* — Koosha Sharifi-Tafreshi
(74) *Attorney, Agent, or Firm* — ScienBiziP, P.C.

(57) ABSTRACT

A display device includes a plurality of pixels, a plurality of scanning signal lines, a plurality of data signal lines, a source driver configured to supply a data signal to the plurality of pixels via a corresponding data signal line of the plurality of data signal lines, and a spare wiring line configured to connect to a disconnected data signal line. For each data signal output to a data signal line with disconnection corrected by the spare wiring line, the source driver sets an output delay amount according to a disconnection position and a line position of a pixel to be supplied with the data signal.

19 Claims, 8 Drawing Sheets

DISPLAY DEVICE

CROSS-REFERENCE TO RELATED APPLICATIONS

This application claims the benefit of priority to Japanese Patent Application Number 2022-126400 filed on Aug. 8, 2022. The entire contents of the above-identified application are hereby incorporated by reference.

BACKGROUND

Technical Field

The disclosure relates to a display device.

A known technique relating to liquid crystal panels repairs the disconnection of a signal line using a spare wiring line. For example, in the method described in WO 2020/012654, a signal voltage is output to a portion of a disconnected signal line beyond a disconnection location, the signal voltage being obtained by correcting a signal voltage to be output to this portion on the basis of the position of the disconnection location, the wiring line resistance of the signal line, and the wiring line resistance of the spare wiring line.

In another example described in JP 2015-082063, a delay correction value is calculated on the basis of a position of a scanning line corresponding to a pixel whose gray scale specified by a gray-scale voltage, and a timing for outputting the gray-scale voltage to a data signal line is corrected (is correction) on the basis of the delay correction value.

SUMMARY

In the methods described in WO 2020/012654 and JP 2015-082063, τs correction cannot be appropriately performed when repairing a disconnection using a spare wiring line.

An object of an aspect of the disclosure is to provide a technique for appropriately performing is correction even when disconnection is corrected using a spare wiring line.

A display device according to an aspect of the disclosure includes: a plurality of pixels; a plurality of scanning signal lines; a plurality of data signal lines; a source driver configured to supply a data signal to the plurality of pixels via a corresponding data signal line of the plurality of data signal lines; and a spare wiring line configured to connect to a disconnected data signal line, wherein for each data signal output to a data signal line with disconnection corrected by the spare wiring line, the source driver sets an output delay amount according to a disconnection position and a line position of a pixel to be supplied with the data signal.

Accordingly, even when disconnection is corrected using a spare wiring line, τs correction can be appropriately performed.

BRIEF DESCRIPTION OF DRAWINGS

The disclosure will be described with reference to the accompanying drawings, wherein like numbers reference like elements.

DESCRIPTION OF EMBODIMENTS

Figure 1:
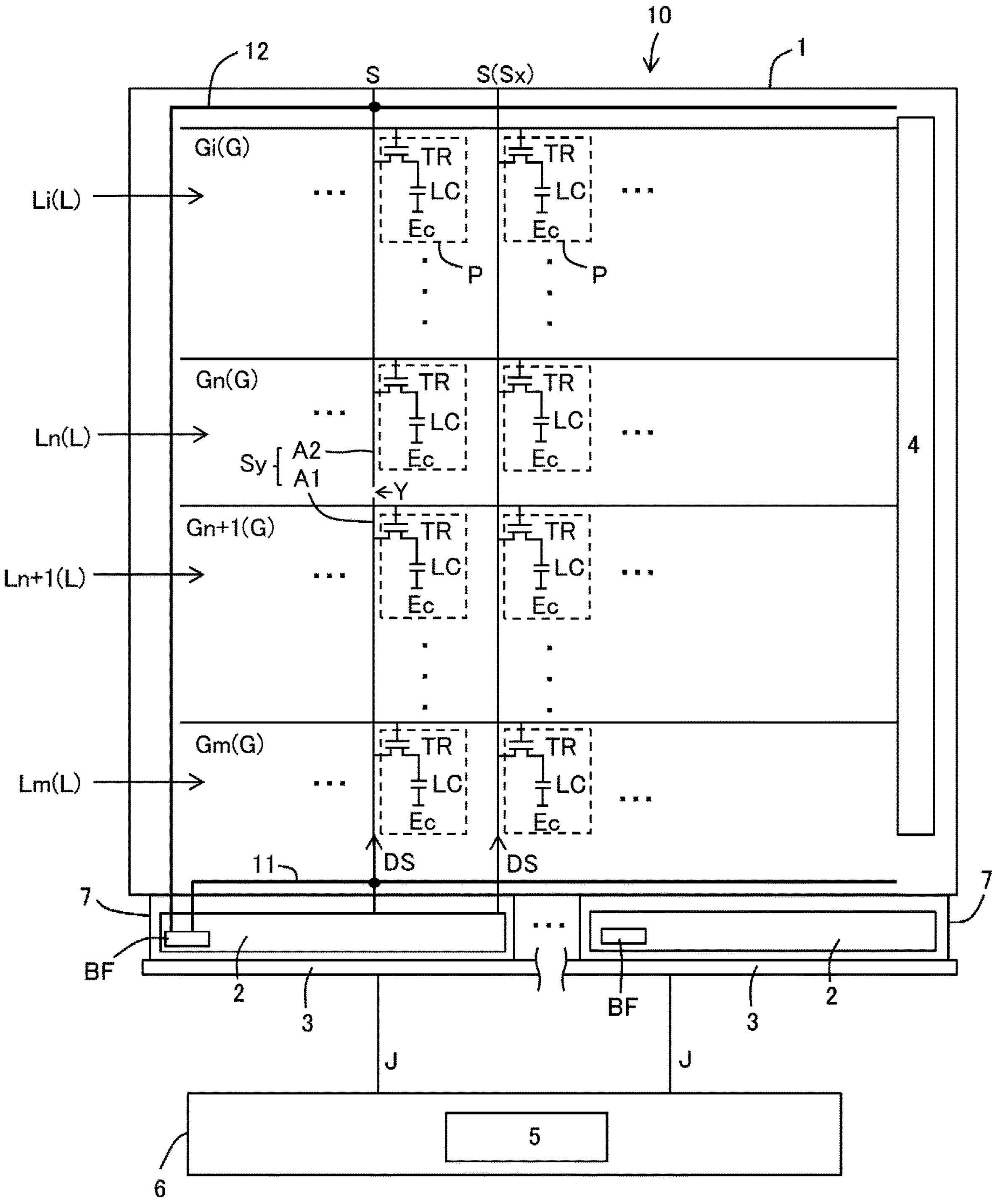
FIG. 1 is a schematic diagram illustrating a configuration of a display device according to the present embodiment.

FIG. 1 is a schematic diagram illustrating a configuration of a display device according to the present embodiment. As illustrated in FIG. 1, a display device 10 includes a liquid crystal panel 1, a source driver 2, a source substrate 3, a gate driver 4, a control unit 5, and a control board 6.

The liquid crystal panel 1 includes a plurality of scanning signal lines G, a plurality of data signal lines S that intersect the plurality of scanning signal lines G, and a plurality of pixels P provided in a one-to-one correspondence at each intersection between the plurality of scanning signal lines G and the plurality of data signal lines S. The pixels P each include a transistor TR and a liquid crystal capacitance LC. The liquid crystal capacitance LC includes a pixel electrode, a common electrode Ec, and a liquid crystal layer disposed between the pixel electrode and the common electrode Ec. The gate terminal of the transistor TR is connected to the scanning signal line G, the source terminal of the transistor TR is connected to the data signal line S, and a data signal DS is written to the liquid crystal capacitance LC from the data signal line S via the transistor TR.

The control unit 5 (e.g., a timing controller) is provided on the control board 6. The control unit 5 outputs a display signal J (e.g., a differential signal) to the source driver 2. The control board 6 and the source substrate 3 are connected to one another via a Flexible Flat Cable (FFC), and the source substrate 3 and the liquid crystal panel 1 are connected to one another via a plurality of Flexible Printed Circuits (FPCs) 7. The plurality of FPCs 7 are each provided with the source driver 2, and each source driver 2 includes a spare wiring line buffer BF. A plurality of the source substrates 3 may be provided. The source driver 2 outputs the data signal DS to the data signal line S of the liquid crystal panel 1. The gate driver 4 outputs a scanning signal GS to a scanning signal line G of the liquid crystal panel 1. In the example described hereinafter, the source driver 2 is provided below the liquid crystal panel 1, and the plurality of pixel rows (hereinafter, referred to as lines L) of the liquid crystal panel 1 are scanned from up to down.

As illustrated in FIG. 1, the liquid crystal panel 1 is provided with spare wiring lines 11 and 12 for correcting disconnection of the data signal lines S. The spare wiring lines 11 and 12 are connected to a disconnected data signal line Sy. The spare wiring line 12 is connected to an output terminal of the spare wiring line buffer BF included in the source driver 2.

The data signal line (hereinafter also referred to as the corrected data signal line) Sy for which disconnection has been corrected using the spare wiring lines 11 and 12 includes a first portion A1 that is located on the same side of a disconnection position Y as the source driver 2 and that is connected to the source driver 2 without passing through the spare wiring lines 11 and 12, and a second portion A2 that is located on the opposite side of the disconnection position Y from the source driver 2 and that is connected to the source driver 2 via the spare wiring lines 11 and 12.

Example 1

The source driver 2 of Example 1 sets, for each data signal DS output to the data signal line Sy with disconnection corrected by the spare wiring lines 11 and 12, an output delay amount UD according to the disconnection position Y and the line position L of the pixel P to be supplied with the data signal DS.

The source driver 2 is connected to the first portion A1 of the corrected data signal line Sy and is connected to the second portion A2 of the corrected data signal line Sy via the spare wiring line 11, the spare wiring line buffer BF, and the spare wiring line 12. The spare wiring line 11 is connected at one end to an input terminal of the spare wiring line buffer BF and, at a peripheral region on a side close to the source driver 2, is connected to the first portion A1 of the corrected data signal line Sy by a disconnection correction process using a laser or the like. The spare wiring line 12 is connected at one end to an output terminal of the spare wiring line buffer BF and, at a peripheral region on a side far from the source driver 2, is connected to the second portion A2 of the corrected data signal line Sy by a disconnection correction process using a laser or the like. The data signal DS output from the source driver 2 is transmitted to the first portion A1 without passing through the spare wiring lines 11 and 12, and is also transmitted to the second portion A2 via the spare wiring line 11, the spare wiring line buffer BF, and the spare wiring line 12. In the disclosure, the data signal DS output to the first portion A1 means the data signal DS supplied to the pixel P connected to the first portion A1, and the data signal DS output to the second portion A2 means the data signal DS supplied to the pixel P connected to the second portion A2.

The source driver 2 sets the output delay amount UD for each data signal DS output to the second portion A2. In other words, the source driver 2 delays the output timing of each data signal DS output to the second portion A2 by a period of time corresponding to the output delay amount UD set for each data signal DS. The source driver 2 sets the largest output delay amount UD for, of each data signal DS output to the second portion A2 of one corrected data signal line Sy, the data signal DS supplied to the pixel P of a line position Li farthest from the source driver 2, and sets the smallest output delay amount UD for the data signal DS supplied to the pixel P of a line position Ln closest to the disconnection position Y.

In the present example, the source driver 2 sets, for each data signal DS output to the second portion A2, the output delay amount UD that is smaller the closer the line position L of the pixel P to be supplied with the data signal DS is to the disconnection position Y. Note that the same output delay amount UD may be set for the data signals DS supplied to the pixels P at two or more adjacent line positions L.

The source driver 2 also sets the output delay amount UD for each data signal DS output to the first portion A1. In other words, the source driver 2 delays the output timing of each data signal DS output to the first portion A1 by a period of time corresponding to the output delay amount UD set for each data signal DS. The source driver 2 sets the largest output delay amount UD for, of each data signal DS output to the first portion A1 of one corrected data signal line Sy, the data signal DS supplied to the pixel P of a line position Lm closest to the source driver 2, and sets the smallest output delay amount UD for the data signal DS supplied to the pixel P of a line position Ln+1 closest to the disconnection position Y.

In the present example, the source driver 2 sets, for each data signal DS output to the first portion A1, the output delay amount UD that is smaller the closer the line position L of the pixel P to be supplied with the data signal DS is to the disconnection position Y. Note that the same output delay amount UD may be set for the data signals DS supplied to the pixels P at two or more adjacent line positions L.

The source driver 2 also sets the output delay amount UD for the data signal DS output to a normal data signal line Sx without disconnection correction. In other words, the source driver 2 delays the output timing of each data signal DS output to the normal data signal line Sx by a period of time corresponding to the output delay amount UD set for each data signal DS. The source driver 2 sets the largest output delay amount UD for, of each data signal DS output to one normal data signal line Sx, the data signal DS supplied to the pixel P of a line position Lm closest to the source driver 2, and sets the smallest output delay amount UD for the data signal DS supplied to the pixel P of the line position Li farthest from the source driver 2.

In the present example, the source driver 2 sets, for each data signal DS output to the normal data signal line Sx, the output delay amount UD that is smaller the farther the line position L of the pixel P to be supplied with the data signal DS is from the source driver 2. Note that the same output delay amount UD may be set for the data signals DS supplied to the pixels P at two or more adjacent line positions L.

Figure 2:
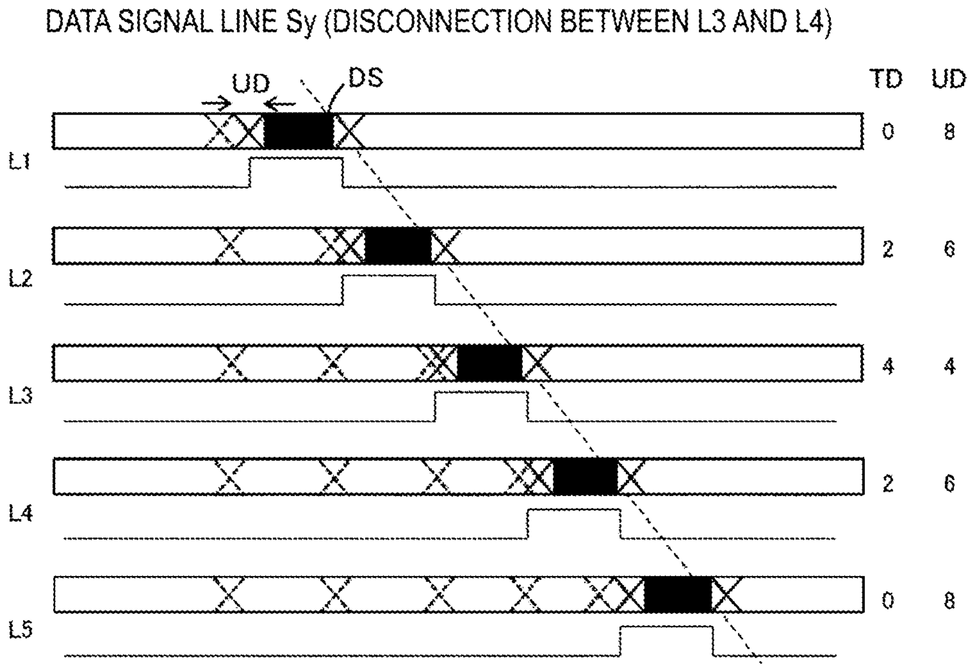
FIG. 2 is a schematic diagram illustrating examples of transmission delay amounts and output delay amounts of a data signal output to a data signal line with disconnection corrected.

FIG. 2 is a schematic diagram illustrating examples of transmission delay amounts and output delay amounts of a data signal output to a data signal line with disconnection corrected. For ease of description, in FIG. 2, the liquid crystal panel 1 includes lines L1 to L5, and the disconnection position Y is located between the line L3 and the line L4. Accordingly, in the example in FIG. 2, each pixel P of the lines L1 to L3 is connected to the second portion A2, and each pixel P of the lines L4 and L5 is connected to the first portion A1. A transmission delay amount TD of the second portion A2 is larger when the line position L of the pixel P is closer to the disconnection position Y. Thus, the source driver 2 sets, for each data signal DS output to the second portion A2, the output delay amount UD that is smaller the closer the line position L of the pixel P to be supplied with the data signal DS is to the disconnection position Y. For example, the output delay amount UD of the data signal DS supplied to the pixel P of the line position L1 (transmission delay amount TD=0) is set to '8', the output delay amount UD of the data signal DS supplied to the pixel P of the line position L2 (transmission delay amount TD=2) is set to '6', and the output delay amount UD of the data signal DS supplied to the pixel P of the line position L3 (transmission delay amount TD=4) is set to '4'.

A transmission delay amount TD of the first portion A1 is larger when the line position L of the pixel P is closer to the disconnection position Y. Thus, the source driver 2 sets, for each data signal DS output to the first portion A1, the output delay amount UD that is smaller the closer the line position L of the pixel P to be supplied with the data signal DS is to the disconnection position Y. For example, the output delay amount UD of the data signal DS supplied to the pixel P of the line position L4 (transmission delay amount TD=2) is set to '6', and the output delay amount UD of the data signal DS supplied to the pixel P of the line position L5 (transmission delay amount TD=0) is set to '8'.

Figure 3:
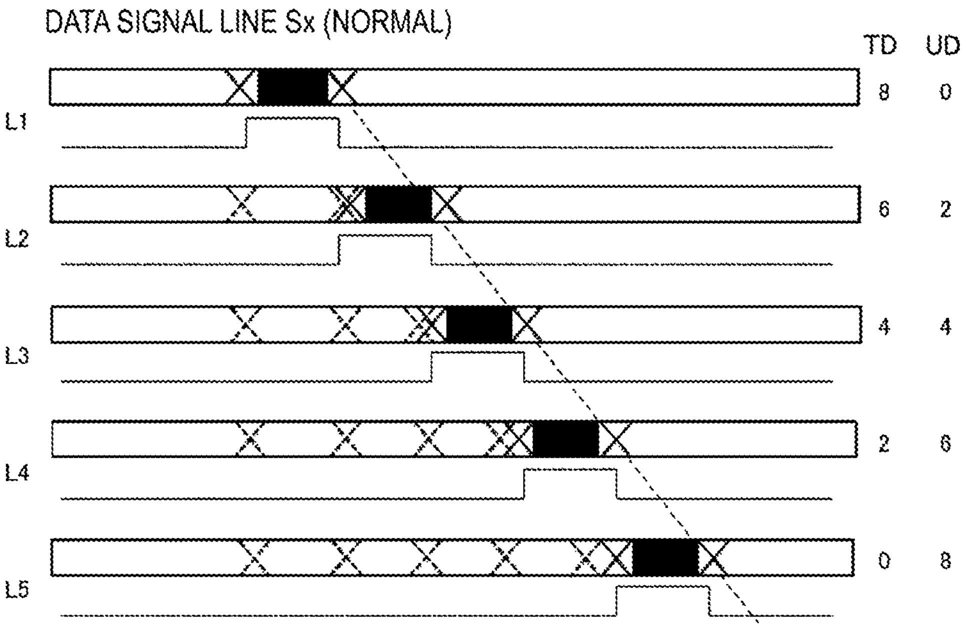
FIG. 3 is a schematic diagram illustrating examples of transmission delay amounts and output delay amounts of a data signal output to a normal data signal line.

FIG. 3 is a schematic diagram illustrating examples of transmission delay amounts and output delay amounts of a data signal output to a normal data signal line. The transmission delay amount TD of the data signal line Sx is larger when the line position L of the pixel P is farther from the source driver 2. Thus, the source driver 2 sets, for each data signal DS output to the normal data signal line Sx, the output delay amount UD that is smaller the farther the line position L of the pixel P to be supplied with the data signal DS is from the source driver 2. For example, the output delay amount UD of the data signal DS supplied to the pixel P of the line position L1 (transmission delay amount TD=8) is set to '0', the output delay amount UD of the data signal DS supplied to the pixel P of the line position L3 (transmission delay amount TD=4) is set to '4', and the output delay amount UD of the data signal DS supplied to the pixel P of the line position L5 (transmission delay amount TD=0) is set to '8'.

As described above, by making the sum of the output delay amount UD and the transmission delay amount TD between the first portion A1 and the second portion A2 in the corrected data signal line Sy the same and making the sum of the output delay amount UD and the transmission delay amount TD between the corrected data signal line Sy and the normal data signal line Sx the same, mistiming of the transmission of the data signal DS between the data signal lines Sx and Sy can be corrected. Thus, even when the disconnection is corrected using the spare wiring lines 11 and 12, τs correction can be appropriately performed.

Figure 4:
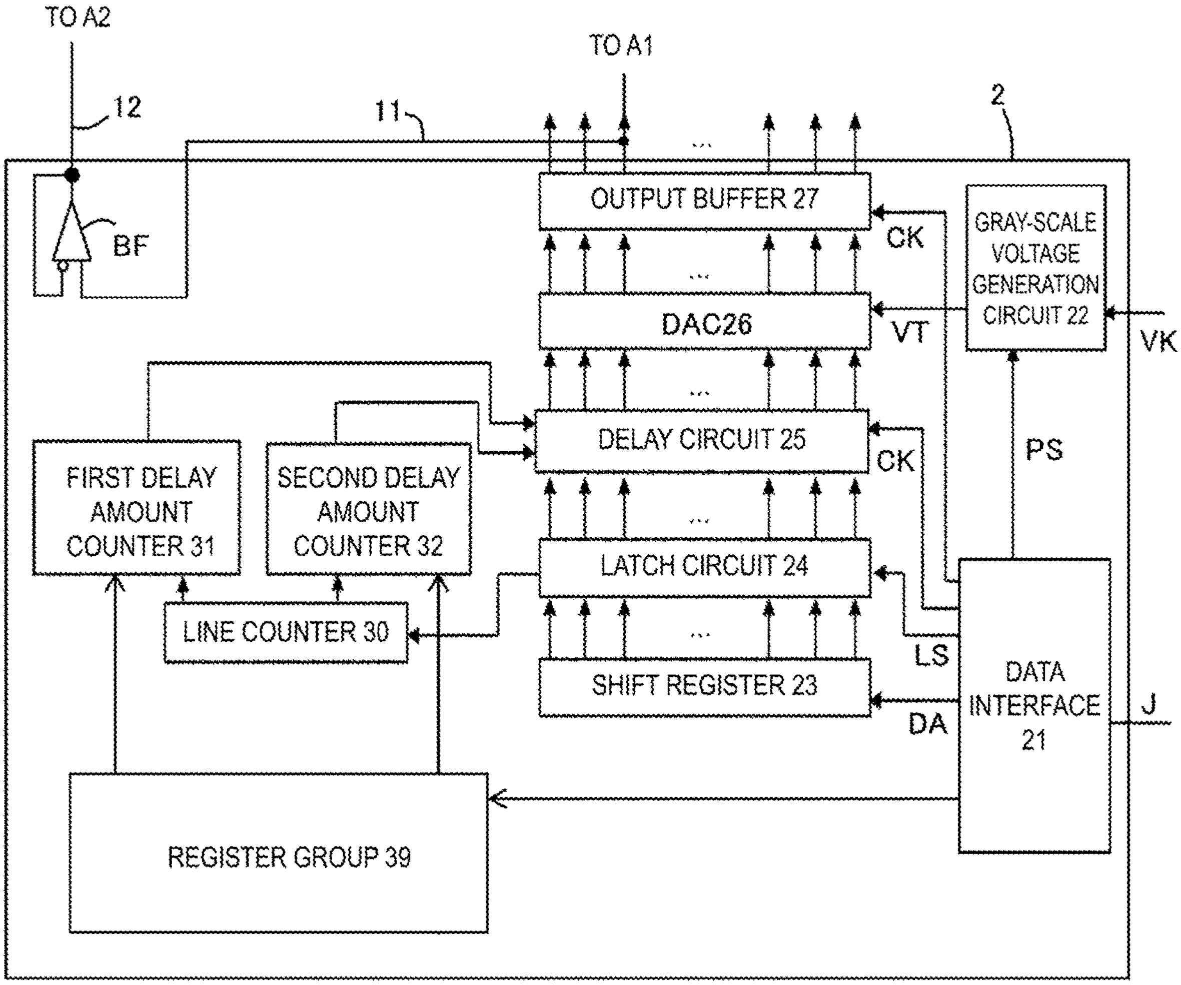
FIG. 4 is a block diagram illustrating a configuration example of a source driver according to Example 1.

FIG. 4 is a block diagram illustrating a configuration example of a source driver according to Example 1. As illustrated in FIG. 4, the source driver 2 includes a data interface 21, a gray-scale voltage generation circuit 22, a shift register 23, a latch circuit 24, a delay circuit 25, a Digital Analog Converter (DAC) 26, an output buffer 27, a line counter 30, a first delay amount counter 31, a second delay amount counter 32, the spare wiring line buffer BF, and a register group 39. The spare wiring line 11 is connected to the spare wiring line 12 via the spare wiring line buffer BF.

The data interface 21 uses the display signal J to generate signals such as a decoded image signal DA, a clock signal CK, a latch signal LS, and a polarity signal PS. The shift register 23 sequentially receives the image signals DA (digital signals) from the data interface 21 and repeats a shift operation until the number of the image signals DA equals a predetermined number. The latch circuit 24 latches the image signals DA output from the shift register 23 on the basis of the latch signal LS and outputs the latched image signals DA to the delay circuit 25. The delay circuit 25 has a function of delaying and holding the image signals DA for a discretionary period of time.

The line counter 30 is a counter that counts the line position of the pixel P to be supplied with the data signal DS. The line counter 30 increases the count value by one each time one horizontal period ends according to the latch signal LS output from the data interface 21. Also, the line counter 30 resets the count value to zero every time one frame is completed. The count value of the line counter 30 is output to the first delay amount counter 31 and the second delay amount counter 32.

The first delay amount counter 31 is a counter that increases the count value as line scanning progresses in one vertical scanning period. In the present example, the count value of the first delay amount counter 31 is used when setting the output delay amount UD for each data signal DS output to the normal data signal line Sx and the first portion A1 of the corrected data signal line Sy. The count value of the first delay amount counter 31 is set to a first initial value when the count value of the line counter 30 is zero. Also, the count value of the first delay amount counter 31 increases by one each time the count value of the line counter 30 becomes a multiple of the line number for changing a delay amount. The first initial value is an initial value (or a value corresponding thereto) of the output delay amount UD associated with the normal data signal line Sx, and specifically is the output delay amount UD (or a value corresponding thereto) set for the data signal DS which is the first output to the normal data signal line Sx in one frame. In the present example, the first initial value is the output delay amount UD set for the data signal DS supplied to the pixel P of the line position L1 connected to the normal data signal line Sx and is '0', for example. In addition, the line number for changing a delay amount is a discretionary number. For example, when the line number for changing the delay amount is '8', the count value of the first delay amount counter 31 is increased by one each time the count value of the line counter 30 becomes a multiple of '8'. In this case, the same output delay amount UD is set for the data signals DS supplied to the pixels P of eight adjacent line positions L.

The second delay amount counter 32 is a counter that decreases the count value as line scanning progresses in one vertical scanning period. In the present example, the count value of the second delay amount counter 32 is used when setting the output delay amount UD for each data signal DS output to the second portion A2 of the corrected data signal line Sy. The count value of the second delay amount counter 32 is set to a second initial value when the count value of the line counter 30 is zero. Also, the count value of the second delay amount counter 32 decreases by one each time the count value of the line counter 30 becomes a multiple of the line number for changing a delay amount. The second initial value is an initial value (or a value corresponding thereto) of the output delay amount UD associated with the second portion A2 of the corrected data signal line Sy, and specifically is the output delay amount UD (or a value corresponding thereto) set for the data signal DS which is the first output to the second portion A2 in one frame. In the present example, the second initial value is the output delay amount UD set for the data signal DS supplied to the pixel P of the line position L1 connected to the second portion A2 and is '8', for example. The line number for changing a delay amount is a discretionary number. The line number for changing a delay amount may be the same for both the first delay amount counter 31 and the second delay amount counter 32, or may be different. For example, when the line number for changing the delay amount is '8', the count value of the second delay amount counter 32 is decreased by one each time the count value of the line counter 30 becomes a multiple of '8'. In this case, the same output delay amount UD is set for the data signals DS supplied to the pixels P of eight adjacent line positions L.

The delay circuit 25 sets the output delay amount UD for each data signal DS output to the plurality of data signal lines S on the basis of the count value of the first delay amount counter 31 and the count value of the second delay amount counter 32. In the present example, the delay circuit 25 sets the output delay amount UD based on the count value of the first delay amount counter 31 for each data signal DS output to the normal data signal line Sx and the first portion A1 of the corrected data signal line Sy. Also, the delay circuit 25 sets the output delay amount UD based on the count value of the second delay amount counter 32 for each data signal DS output to the second portion A2 of the corrected data signal line Sy.

Specifically, the delay circuit 25 holds each image signal DA corresponding to the data signal DS output to the normal data signal line Sx for a period of time corresponding to a clock number that corresponds to the count value of the first delay amount counter 31 and delays the output timing to the DAC 26. Here, the period of time corresponding to the clock number that corresponds to the count value of the first delay amount counter 31 corresponds to the period of time corresponding to the output delay amount UD associated with the data signal DS (data signal DS output in the current horizontal period) to be output among the data signals DS output to the normal data signal line Sx. In this manner, the output timing of the data signal DS output to the normal data signal line Sx is delayed by a period of time corresponding to the output delay amount UD associated with the data signal DS.

In addition, the delay circuit 25, for each image signal DA corresponding to the data signal DS output to the corrected data signal line Sy, switches between the delay amount counters (the first delay amount counter 31 and the second delay amount counter 32) to be referenced, according to the count value of the line counter 30, and sets the output delay amount UD. In other words, while the count value of the line counter 30 is in a range from 0 to a value corresponding to the disconnection position Y (that is, in the period of time the data signal DS is supplied to the pixel P connected to the second portion A2), the delay circuit 25 holds each image signal DA corresponding to the data signal DS output to the corrected data signal line Sy (the second portion A2 in this example) for a period of time corresponding to the clock number that corresponds to the count value of the second delay amount counter 32, and delays the output timing to the DAC 26. Here, the period of time corresponding to the clock number that corresponds to the count value of the second delay amount counter 32 corresponds to the period of time corresponding to the output delay amount UD associated with the data signal DS to be output among the data signals DS output to the second portion A2. In this manner, the output timing of the data signal DS output to the second portion A2 of the corrected data signal line Sy is delayed by a period of time corresponding to the output delay amount UD associated with the data signal DS.

On the other hand, when the count value of the line counter 30 is greater than the value corresponding to the disconnection position Y (that is, in the period of time the data signal DS is supplied to the pixel P connected to the first portion A1), the delay circuit 25 holds each image signal DA corresponding to the data signal DS output to the corrected data signal line Sy (the first portion A1 in this example) for a period of time corresponding to the clock number that corresponds to the count value of the first delay amount counter 31, and delays the output timing to the DAC 26. Here, the period of time corresponding to the clock number that corresponds to the count value of the first delay amount counter 31 corresponds to the period of time corresponding to the output delay amount UD associated with the data signal DS to be output of the normal data signal line Sx described above as well as to the period of time corresponding to the output delay amount UD associated with the data signal DS to be output among the data signals DS output to the first portion A1. In this manner, the output timing of the data signal DS output to the first portion A1 of the corrected data signal line Sy is delayed by a period of time corresponding to the output delay amount UD associated with the data signal DS.

The gray-scale voltage generation circuit 22 generates a gray-scale voltage VT on the basis of the polarity signal PS, gamma data for gamma correction, and a reference voltage VK, and outputs the gray-scale voltage VT to the DAC 26.

The DAC 26 uses the gray-scale voltage VT output from the gray-scale voltage generation circuit 22 to convert the image signals DA (digital signals) output from the delay circuit 25 into the data signals DS (analog signals) and outputs the data signals DS to the output buffer 27.

The output buffer 27 outputs the data signals DS output from the DAC 26 to the data signal lines S (Sx and Sy).

The spare wiring line buffer BF is connected at one of two input terminals to the spare wiring line 11 and is connected at the output terminal to the spare wiring line 12. Output is fed back to the other of the two input terminals.

The register group 39 are registers for holding a setting value used in the source driver 2, and the data interface 21 sets a value for the register group 39 on the basis of the display signal J. The register group 39 includes the following registers, for example.

(1) a Register Set with a Value Indicating Whether the Corrected Data Signal Line Sy is Present in the Liquid Crystal Panel 1 (Register A)

When the value of the register A indicates that the corrected data signal line Sy is not present, the delay circuit 25 determines all of the data signal lines S to be normal and sets the output delay amount UD for each data signal DS on the basis of the count value of the first delay amount counter 31.

On the other hand, when the value of the register A indicates that the corrected data signal line Sy is present, for the corrected data signal line Sy indicated by the value of a register B described below, the delay circuit 25 sets the output delay amount UD for each data signal DS output to the first portion A1 on the basis of the count value of the first delay amount counter 31 and sets the output delay amount UD for each data signal DS output to the second portion A2 on the basis of the count value of the second delay amount counter 32. Also, for the normal data signal line Sx, not the corrected data signal line Sy indicated by the value of the register B, the delay circuit 25 sets the output delay amount UD for each data signal DS on the basis of the count value of the first delay amount counter 31.

(2) Register Set with Value Indicating Corrected Data Signal Line Sy (Register B)

The register B is set with a number or the like allocated to the corrected data signal line Sy, for example. When there are multiple corrected data signal lines Sy, the register B is set with a value indicating each of the corrected data signal lines Sy.

(3) Register Set with Value Indicating Disconnection Position Y in Corrected Data Signal Line Sy (Register C)

The register C is set with an address or the like in the vertical direction of the disconnection position Y as a value indicating the disconnection position Y. When there are multiple corrected data signal lines Sy, the register C is set with a value indicating the disconnection position Y for each of the corrected data signal lines Sy. The delay circuit 25 references the value of the register C and determines whether the count value of the line counter 30 is greater than the value corresponding to the disconnection position Y.

(4) Register Set with First Initial Value (Register D)

The value set for the register D is set for the first delay amount counter 31 as the initial value.

(5) Register Set with Second Initial Value (Register E)

The value set for the register E is set for the second delay amount counter 32 as the initial value.

(6) Register Set with Line Number for Changing a Delay Amount (Register F)

The first delay amount counter 31 and the second delay amount counter 32 reference the value set for the register F and update the count value.

When is correction is not performed, at the first portion A1 side of the corrected data signal line Sy and the normal data signal line Sx, a ghost image is displayed at the lower side of the image because the data signal DS supply timing is later than the timing at which the scanning signal becomes active, and at the second portion A2 side, a ghost image is displayed at the upper side of the image because the data signal DS supply timing is earlier than the timing at which the scanning signal becomes active. When is correction is performed without using the present example, at the first portion A1 side of the corrected data signal line Sy and the normal data signal line Sx, the ghost image disappears because the timing at which the scanning signal becomes active matches the data signal DS supply timing. However, at the second portion A2 side, the ghost image is more distinct than when is correction is not performed because the data signal DS supply timing is further earlier than the timing at which the scanning signal becomes active. On the other hand, in Example 1, at the first portion A1 side and the second portion A2 side of the corrected data signal line Sy and the normal data signal line Sx, the timing at which the scanning signal becomes active matches the data signal DS supply timing. Thus, in any case, the ghost image disappears, and image quality is improved.

Note that in the disclosure, the data signal DS supply timing refers to the timing at which the data signal DS is supplied to the supply target pixel P regardless of whether the transistor TR of the supply target pixel P is on, or in other words the timing at which the data signal DS reaches the supply target pixel P. In addition, the timing at which the scanning signal becomes active and the data signal DS supply timing are time periods of a discretionary length of time. The timing at which the scanning signal becomes active matching the data signal DS supply timing does not necessarily mean that both time periods have matching start and/or end times, and refers to both time periods having an appropriate relationship (this includes partially overlapping or one being included within the other) such that a desired voltage based on the data signal DS is appropriately applied to the supply target pixel P.

In the present example described herein, the source driver 2 is provided below the liquid crystal panel 1 and the data signals DS are supplied in order from the pixel P of the line position L1 farthest from the source driver 2. However, the source driver 2 may be provided above the liquid crystal panel 1, or the data signals DS may be supplied in order from the pixel P of the line position closest to the source driver 2, and, in these examples, a similar effect to the present example is obtained.

In an example in which the source driver 2 is provided below the liquid crystal panel 1 and the data signals DS are supplied in order from the pixel P of the line position Lm closest to the source driver 2, the delay amount counter to be referenced is the opposite of that in Example 1 described above, the count value of the second delay amount counter 32 is used when setting the output delay amount UD for each data signal DS output to the normal data signal line Sx and the first portion A1 of the corrected data signal line Sy, and the count value of the first delay amount counter 31 is used when setting the output delay amount UD for each data signal DS output to the second portion A2 of the corrected data signal line Sy. This example achieves a similar effect to that of Example 1.

Example 2

Figure 5:
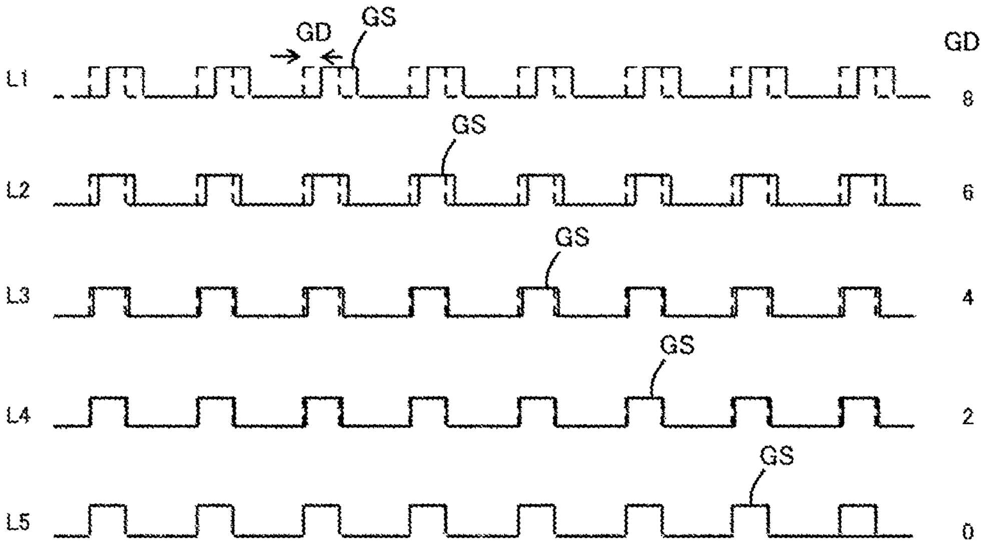
FIG. 5 is a timing chart illustrating scanning signals of Example 2.

FIG. 5 is a timing chart illustrating scanning signals of Example 2. For ease of description, in FIG. 5, the liquid crystal panel 1 in FIG. 1 includes the lines L1 to L5. In Example 2, as illustrated in FIG. 5, the gate driver 4 delays a scanning signal GS according to the line position L of the pixel P to be supplied with the scanning signal GS (in FIG. 5, the scanning signal in the case of no delay is illustrated with a dashed line). Specifically, the gate driver 4 delays the scanning signal GS more when the line position L of the pixel P to be supplied with the scanning signal GS is farther from the source driver 2 so that, at the normal data signal line Sx, the timing at which the scanning signal GS becomes active and the data signal DS supply timing match. For example, a delay amount (output delay amount) GD of the scanning signal GS of the line position L1 farthest from the source driver 2 is set to '8', and the delay amount GD of the scanning signal GS of the line position L5 closest to the source driver 2 is set to '0'.

The first portion A1 of the corrected data signal line Sy, as with the normal data signal line Sx, is directly connected to the source driver 2 without passing through the spare wiring lines 11 and 12. Thus, the first portion A1 of the corrected data signal line Sy and the normal data signal line Sx are essentially the same in terms of the transmission delay amount TD of the data signal DS supplied to the pixel P of the same line position L. In this manner, by the gate driver 4 delaying the scanning signal GS, the timing at which the scanning signal GS becomes active and the data signal DS supply timing match at not only the normal data signal line Sx but also at the first portion A1 of the corrected data signal line Sy. On the other hand, at the second portion A2 of the corrected data signal line Sy, by the gate driver 4 delaying the scanning signal GS, the timing at which the scanning signal GS becomes active and the data signal DS supply timing may become more offset from one another.

The source driver 2 of Example 2 sets, for each data signal DS output to the second portion A2 of the data signal line Sy with disconnection corrected by the spare wiring lines 11 and 12, the output delay amount UD according to the disconnection position Y and the line position L of the pixel P to be supplied with the data signal DS.

Figure 6:
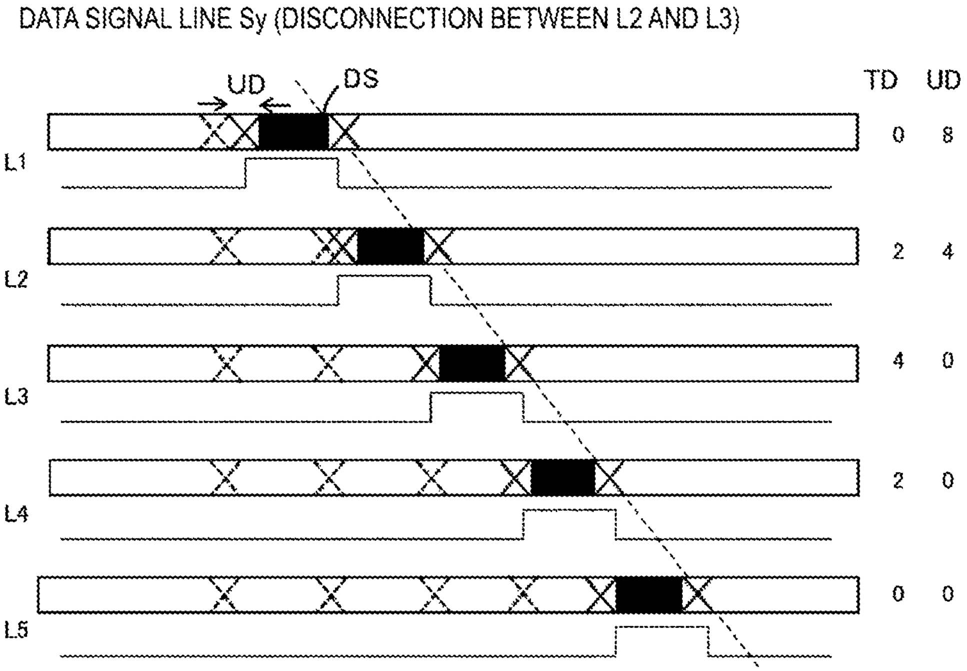
FIG. 6 is a schematic diagram illustrating examples of transmission delay amounts and output delay amounts of a data signal output to a data signal line with disconnection corrected.

FIG. 6 is a schematic diagram illustrating examples of transmission delay amounts and output delay amounts of a data signal output to a data signal line with disconnection corrected. In the example in FIG. 6, the disconnection position Y is between the line L2 and the line L3. Accordingly, in the example in FIG. 6, each pixel P of the lines L1 and L2 is connected to the second portion A2, and each pixel P of the lines L3 to L5 is connected to the first portion A1. The source driver 2 sets the output delay amount UD for each data signal DS output to the second portion A2 (L1 and L2) that connects to the spare wiring line 12 so that the data signal DS supply timing matches the timing at which the scanning signal GS becomes active. The source driver 2 sets the largest output delay amount UD for, of each data signal DS output to the second portion A2 of one corrected data signal line Sy, the data signal DS supplied to the pixel P of the line position L1 farthest (with the largest scanning signal GS output delay) from the source driver 2 and sets the smallest output delay amount UD for the data signal DS supplied to the pixel P of the line position L2 closest (with the smallest scanning signal GS output delay) to the disconnection position Y. For example, the output delay amount UD of the data signal DS supplied to the pixel P of the line position L1 (transmission delay amount TD=0) is set to '8', and the output delay amount UD of the data signal DS supplied to the pixel P of the line position L2 (transmission delay amount TD=2) is set to '4'.

On the other hand, the source driver 2 does not set the output delay amount UD for each data signal DS output to the first portion A1 (L3 to L5) of the corrected data signal line Sy (output delay amount UD is '0'). That is, in Example 2, the output timing of each data signal DS output to the first portion A1 of the corrected data signal line Sy is not delayed. This is because, as described above, by the gate driver 4 delaying the scanning signal GS, the timing at which the scanning signal GS becomes active and the data signal DS supply timing match at the first portion A1 of the corrected data signal line Sy.

By setting the output delay amount UD for each data signal DS output to the second portion A2 (L1 and L2) as illustrated in FIG. 6, at the second portion A2, the sum of the output delay amount UD of the data signal DS and the transmission delay amount TD can be made to match the delay amount GD of the scanning signal GS. Note that, regarding the first portion A1 (L3 to L5), the transmission delay amount TD of the data signal DS and the delay amount GD of the scanning signal GS match (the delay amount GD of the scanning signal GS is set to match the transmission delay amount TD of the data signal DS).

Figure 7:
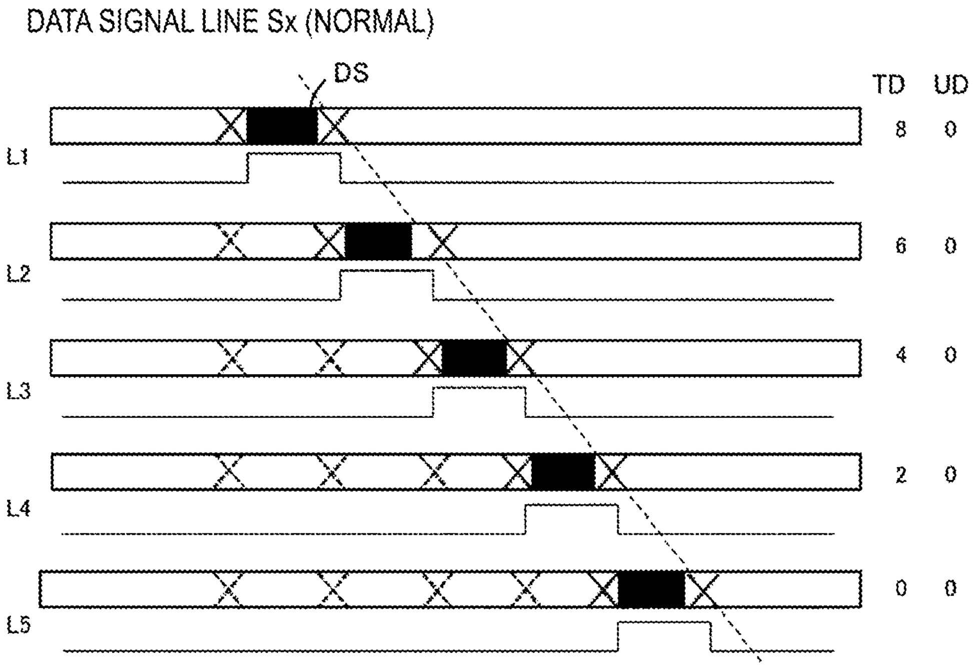
FIG. 7 is a schematic diagram illustrating examples of transmission delay amounts and output delay amounts of a data signal output to a normal data signal line.

FIG. 7 is a schematic diagram illustrating examples of transmission delay amounts and output delay amounts of a data signal output to a normal data signal line. The source driver 2 does not set the output delay amount UD for each data signal DS output to the normal data signal line Sx (output delay amount UD is '0'). That is, in Example 2, the output timing of each data signal DS output to the normal data signal line Sx is not delayed. This is because, as described above, by the gate driver 4 delaying the scanning signal GS, the timing at which the scanning signal GS becomes active and the data signal DS supply timing match at the normal data signal line Sx. Note that regarding the normal data signal line Sx, at all of the lines (L1 to L5), the transmission delay amount TD of the data signal DS and the delay amount GD of the scanning signal GS match (the delay amount GD of the scanning signal GS is set to match the transmission delay amount TD of the data signal DS).

In this manner, at the normal data signal line Sx and the first portion A1 of the corrected data signal line Sy, the delay amount GD of the scanning signal GS is set so that the transmission delay amount TD of the data signal DS and the delay amount GD of the scanning signal GS match at each line. In addition, at the second portion A2 of the corrected data signal line Sy, the output delay amount UD of the data signal DS is set so that the sum of the output delay amount UD of the data signal DS and the transmission delay amount TD matches the delay amount GD of the scanning signal GS at each line. Accordingly, at the first portion A1 and the second portion A2 of the corrected data signal line Sy and the normal data signal line Sx, the timing at which the scanning signal GS becomes active and the data signal DS supply timing can be made to match. This makes ghost images disappear at all locations of the display region and improves image quality.

Figure 8:
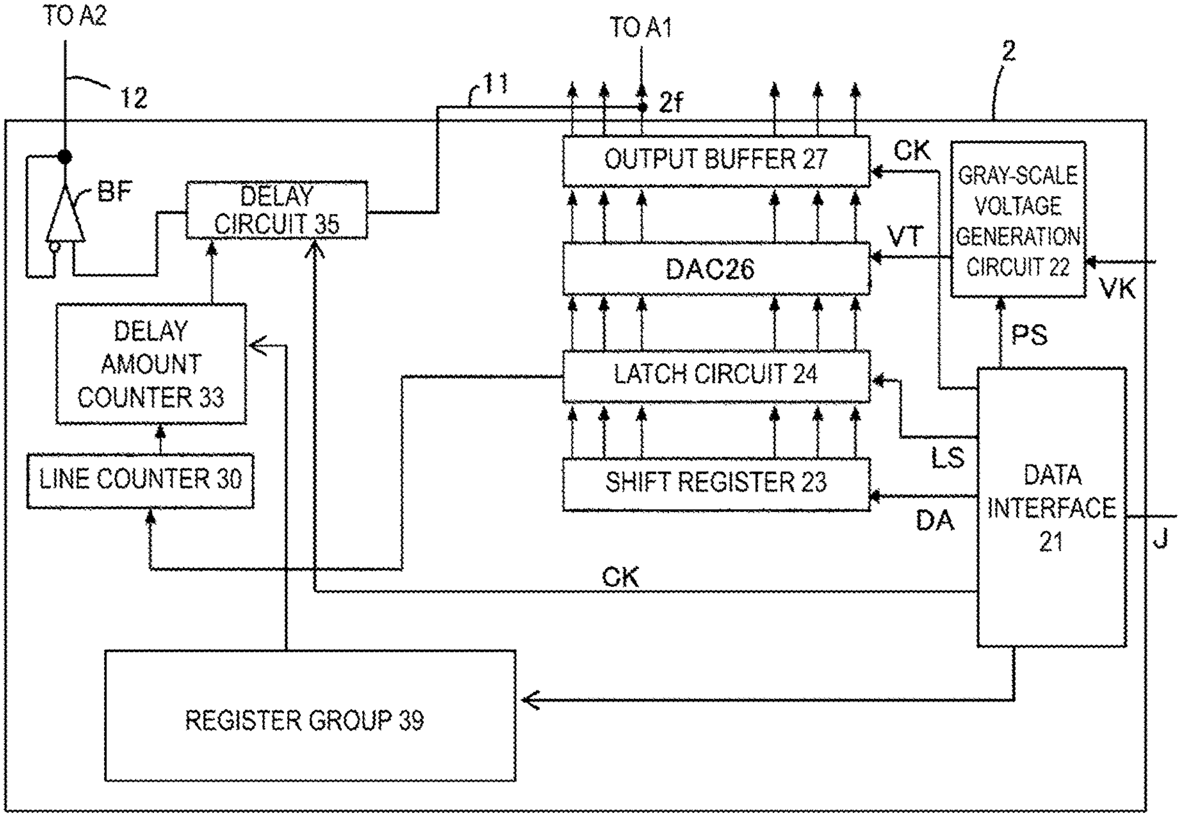
FIG. 8 is a block diagram illustrating a configuration example of a source driver according to Example 2.

FIG. 8 is a block diagram illustrating a configuration example of a source driver according to Example 2. As illustrated in FIG. 8, the source driver 2 includes the data interface 21, the gray-scale voltage generation circuit 22, the shift register 23, the latch circuit 24, a delay amount counter 33, a delay circuit 35, the Digital Analog Converter (DAC) 26, the output buffer 27, the line counter 30, and the spare wiring line buffer BF. In Example 2, the same components used in Example 1 are given the same reference signs. Mainly, the parts of Example 2 that are different from Example 1 will be described.

The delay amount counter 33 is a counter that decreases the count value as line scanning progresses in one vertical scanning period. The count value of the delay amount counter 33 is set to an initial value when the count value of the line counter 30 is zero. Also, the count value of the delay amount counter 33 decreases by one each time the count value of the line counter 30 becomes a multiple of the line number for changing a delay amount.

The delay circuit 35 sets the output delay amount UD for each data signal DS output to the second portion A2 of the corrected data signal line Sy on the basis of the count value of the delay amount counter 33. The delay circuit 35 is disposed on a path running from an output end **2*f* of the source driver 2 to the second portion A2 via the spare wiring lines 11 and 12. For example, the spare wiring line 11 is connected to the first portion A1 of the corrected data signal line Sy connected to the output end 2*f*, and is also connected to the delay circuit 35. Also, the delay circuit 35 is connected to an input terminal of the spare wiring line buffer BF, and an output terminal of the spare wiring line buffer BF is connected to the spare wiring line 12. Thus, the data signal DS output from the source driver 2 to the corrected data signal line Sy is input to the delay circuit 35** of Example 2.

While the count value of the line counter 30 is in a range from 0 to a value corresponding to the disconnection position Y (that is, in the period of time the data signal DS is supplied to the pixel P connected to the second portion A2), the delay circuit 35 holds the input data signal DS (the data signal DS output to the second portion A2 in this example) for a period of time corresponding to the clock number that corresponds to the count value of the delay amount counter 33, and delays the output timing to the spare wiring line buffer BF. Here, the period of time corresponding to the clock number that corresponds to the count value of the delay amount counter 33 corresponds to the period of time corresponding to the output delay amount UD associated with the data signal DS to be output among the data signals DS output to the second portion A2. In this manner, the output timing of the data signal DS output to the second portion A2 of the corrected data signal line Sy is delayed by a period of time corresponding to the output delay amount UD associated with the data signal DS.

On the other hand, when the count value of the line counter 30 is greater than a value corresponding to the disconnection position Y (that is, in the period of time the data signal DS is supplied to the pixel P connected to the first portion A1), the delay circuit 35 does not delay the output timing of the input data signal DS (the data signal DS output to the first portion A1 in this example) to the spare wiring line buffer BF. Note that the first portion A1 of the corrected data signal line Sy is directly connected to the source driver 2 without passing through the spare wiring lines 11 and 12. Thus, the data signal DS output to the first portion A1 is supplied to the supply target pixel P without passing through the delay circuit 35 (output delay amount UD of '0').

Note that, in the present example described herein, the source driver 2 is provided below the liquid crystal panel 1 and the data signals DS are provided in order from the pixel P of the line position L1 farthest from the source driver 2.

However, the source driver 2 may be provided above the liquid crystal panel 1, or the data signals DS may be supplied in order from the pixel P of the line position closest to the source driver 2, and, in these examples, a similar effect to the present example is obtained.

For example, when the source driver 2 is provided below the liquid crystal panel 1 and the data signals DS are supplied in order from the pixel P of the line position Lm closest to the source driver 2, a similar effect to Example 2 is obtained by using a counter that increases the count value with the progress of the line scanning in a vertical scanning period as the delay amount counter 33 (by increasing the count value of the delay amount counter 33 by one each time the count value of the line counter 30 becomes a multiple of the line number for changing a delay amount, and setting the count value of the delay amount counter 33 to an initial value when the count value of the line counter 30 is 0 or a value corresponding to the disconnection position Y).

The embodiments and examples described above are for the purpose of illustration and description and are not intended to be limiting. It will be apparent to those skilled in the art that many variations will be possible in accordance with these examples and descriptions.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device comprising:

a plurality of pixels;

a plurality of scanning signal lines;

a plurality of data signal lines;

a source driver configured to supply a data signal to the plurality of pixels via a corresponding data signal line of the plurality of data signal lines; and a spare wiring line configured to connect to a disconnected data signal line, wherein for each data signal output to a data signal line with disconnection corrected by the spare wiring line, the source driver sets an output delay amount according to a disconnection position and a line position of a pixel to be supplied with the data signal.

2. The display device according to claim 1, wherein the data signal line with disconnection corrected includes a first portion located on a same side of the disconnection position as the source driver and connected to the source driver without passing through the spare wiring line, and a second portion located on an opposite side of the disconnection position to the source driver and connected to the source driver via the spare wiring line, and the source driver sets an output delay amount for each data signal output to the second portion, and of each data signal output to the second portion of the one data signal line with disconnection corrected, sets a largest output delay amount for a data signal supplied to a pixel of a line position farthest from the source driver and sets a smallest output delay amount for a data signal supplied to a pixel of a line position closest to the disconnection position.

3. The display device according to claim 2, wherein the source driver sets, for each data signal output to the second portion, an output delay amount that is smaller the closer a line position of a pixel to be supplied with the data signal is to the disconnection position.

4. The display device according to claim 2, wherein the source driver also sets an output delay amount for each data signal output to the first portion, and of each data signal output to the first portion of the one data signal line with disconnection corrected, sets a largest output delay amount for a data signal supplied to a pixel of a line position closest to the source driver, and sets a smallest output delay amount for a data signal supplied to a pixel of a line position closest to the disconnection position.

5. The display device according to claim 4, wherein the source driver sets, for each data signal output to the first portion, an output delay amount that is smaller the closer a line position of a pixel to be supplied with the data signal is to the disconnection position.

6. The display device according to claim 4, wherein the source driver also sets an output delay amount for each data signal output to a normal data signal line, and of each data signal output to the one normal data signal line, sets a largest output delay amount for a data signal supplied to a pixel of a line position closest to the source driver, and sets a smallest output delay amount for a data signal supplied to a pixel of a line position farthest from the source driver.

7. The display device according to claim 6, wherein the source driver sets, for each data signal output to the normal data signal line, an output delay amount that is smaller the farther a line position of a pixel to be supplied with the data signal is from the source driver.

8. The display device according to claim 6, wherein the source driver includes a first delay amount counter configured to increase a count value as a line scan in a vertical scanning period progresses, a second delay amount counter configured to decrease a count value as a line scan in a vertical scanning period progresses, and a delay circuit configured to set, for each data signal output to the plurality of data signal lines, an output delay amount on a basis of a count value of the first delay amount counter and a count value of the second delay amount counter.

9. The display device according to claim 8, wherein the delay circuit sets, for each data signal output to the first portion, an output delay amount corresponding to a count value of one delay amount counter of the first delay amount counter and the second delay amount counter, and sets, for each data signal output to the second portion, an output delay amount corresponding to a count value of another delay amount counter of the first delay amount counter and the second delay amount counter.

10. The display device according to claim 9, wherein the delay circuit sets, for each data signal output to the normal data signal line, an output delay amount corresponding to a count value of the one delay amount counter.

11. The display device according to claim 8, wherein the source driver further includes a line counter configured to count line positions of pixels to be supplied with a data signal, the first delay amount counter is at a first initial value when a count value of the line counter is 0, and increases a value each time a count value of the line counter becomes a multiple of a predetermined number, and the second delay amount counter is at a second initial value when a count value of the line counter is 0, and decreases a value each time a count value of the line counter becomes a multiple of the predetermined number.

12. The display device according to claim 11, wherein the delay circuit sets, for each data signal output to the data signal line with disconnection corrected, an output delay amount corresponding to a count value of the second delay amount counter when a count value of the line counter is in a range from 0 to a value corresponding to the disconnection position, and sets, for each data signal output to the data signal line with disconnection corrected, an output delay amount corresponding to a count value of the first delay amount counter when a count value of the line counter is greater than a value corresponding to the disconnection position.

13. The display device according to claim 2, further comprising a gate driver configured to supply a scanning signal to the plurality of pixels via a corresponding scanning signal line of the plurality of scanning signal lines, wherein the gate driver delays a scanning signal according to a line position of a pixel to be supplied with a scanning signal.

14. The display device according to claim 13, wherein the gate driver delays a scanning signal more the farther a line position of a pixel to be supplied with a scanning signal is from the source driver.

15. The display device according to claim 13, wherein the source driver includes a delay amount counter configured to increase or decrease a count value as a line scan in a vertical scanning period progresses, and a delay circuit configured to set, for each data signal output to the data signal line with disconnection corrected, an output delay amount on a basis of a count value of the delay amount counter.

16. The display device according to claim 15, wherein the delay circuit does not set an output delay amount for each data signal output to the first portion, and sets an output delay amount corresponding to a count value of the delay amount counter for each data signal output to the second portion.

17. The display device according to claim 15, wherein the source driver further includes a line counter configured to count line positions of pixels to be supplied with a data signal, and the delay amount counter is at an initial value when a count value of the line counter is 0, and increases or decreases a value each time a count value of the line counter becomes a multiple of a predetermined number.

18. The display device according to claim 17, wherein when data signals are supplied in order from a pixel of a line position closest to the source driver, the delay circuit does not set an output delay amount when a count value of the line counter is in a range from 0 to a value corresponding to the disconnection position, and sets an output delay amount according to a count value of the delay amount counter when a count value of the line counter is greater than a value corresponding to the disconnection position, and when data signals are supplied in order from a pixel of a line position farthest from the source driver, the delay circuit sets an output delay amount according to a count value of the delay amount counter when a count value of the line counter is in a range from 0 to a value corresponding to the disconnection position, and does not set an output delay amount when a count value of the line counter is greater than a value corresponding to the disconnection position.

19. The display device according to claim 15, wherein the delay circuit is disposed on a path running from an output end of the source driver to the second portion via the spare wiring line.

* * * * *